(12) United States Patent
Shimizu (10) Patent No.: US 10,569,408 B2
(45) Date of Patent: Feb. 25, 2020

(54) HANDLE FOR ELECTRIC TOOLS AND ELECTRIC TOOL PROVIDED WITH SAME

(71) Applicant: YAMABIKO CORPORATION, Tokyo (JP)

(72) Inventor: Kunio Shimizu, Hiroshima (JP)

(73) Assignee: YAMABIKO CORPORATION, Tokyo (JP)

( * ) Notice: Subject to any disclaimer, the term of this patent is extended or adjusted under 35 U.S.C. 154(b) by 244 days.

(21) Appl. No.: 15/522,738

(22) PCT Filed: Jan. 13, 2015

(86) PCT No.: PCT/JP2015/000106
§ 371 (c)(1),
(2) Date: Apr. 27, 2017

(87) PCT Pub. No.: WO2016/113770
PCT Pub. Date: Jul. 21, 2016

(65) Prior Publication Data
US 2017/0326721 A1 Nov. 16, 2017

(51) Int. Cl.
*B25F 5/02* (2006.01)
*A01G 3/053* (2006.01)
*A01G 3/037* (2006.01)
*A01D 34/68* (2006.01)

(52) U.S. Cl.
CPC .............. *B25F 5/026* (2013.01); *A01D 34/68* (2013.01); *A01G 3/037* (2013.01); *A01G 3/053* (2013.01); *A01G 3/0535* (2013.01)

(58) Field of Classification Search
CPC ......... B25F 5/026; A01D 34/68; A01G 3/037; A01G 3/053; A01G 3/0535

USPC ........................................................ 173/162.2
See application file for complete search history.

(56) References Cited

U.S. PATENT DOCUMENTS

| | | | | |
|---|---|---|---|---|
| 5,867,910 A | * | 2/1999 | Stegall | A01G 3/053 173/170 |
| 6,178,642 B1 | * | 1/2001 | Schaer | A01G 3/053 30/216 |
| 7,216,880 B2 | * | 5/2007 | Laffin | A61G 5/14 16/430 |

(Continued)

FOREIGN PATENT DOCUMENTS

| CN | 202622752 U | * | 12/2012 |
|---|---|---|---|
| CN | 102047815 B | * | 4/2014 |

(Continued)

*Primary Examiner* — Alex M Valvis
*Assistant Examiner* — David G Shutty
(74) *Attorney, Agent, or Firm* — Maschoff Brennan (57) ABSTRACT

A handle includes: a switch lever having an operational portion in an inverted U-shape, and configured to press an on/off switch when the operational portion is gripped and pressed; a handle body provided with the on/off switch mounted thereto and having an inner peripheral slit from which the operational portion of the switch lever housed in the handle body projects; a spring having a supported portion and a pair of arms extending from the supported portion, housed in the handle body, and biasing and pushing the switch lever back; and a plurality of limiters provided at locations in either the handle body or the switch lever at a distance from the spring, and configured to limit movement of the switch lever.

9 Claims, 11 Drawing Sheets

(56) References Cited

U.S. PATENT DOCUMENTS

| | | | |
|---|---|---|---|
| 2005/0230235 A1* | 10/2005 | Park | A01D 34/6818 |
| | | | 200/334 |
| 2005/0284647 A1* | 12/2005 | Stones | A01G 3/053 |
| | | | 173/170 |
| 2010/0031515 A1 | 2/2010 | Hurley | |
| 2010/0236801 A1 | 9/2010 | Furusawa et al. | |

FOREIGN PATENT DOCUMENTS

| | | | | |
|---|---|---|---|---|
| EP | 0422773 A2 * | 4/1991 | | B27B 17/0008 |
| EP | 0469757 A1 * | 2/1992 | | H01H 9/06 |
| EP | 0469757 A1 | 2/1992 | | |
| JP | 10-257821 A | 9/1998 | | |

\* cited by examiner

HANDLE FOR ELECTRIC TOOLS AND ELECTRIC TOOL PROVIDED WITH SAME

TECHNICAL FIELD

The present invention relates to a handle for an electric tool, having an on/off switch and mounted to an electric tool such as a hedge trimmer, and an electric tool including such a handle.

BACKGROUND ART

A portable power tool has been known from Patent Document 1, for example. This tool includes a handle having a formed wire spring and a manually operational member via which a switch is turned on and off and which has an inverted U-shape. The formed wire spring has left and right legs spaced from each other. These legs act at two spaced locations between a base of the handle and a base of the manually operational member so as to bias the manually operational member toward a released position. The handle includes, at four locations, a combination of a post and a slot to limit the movement of a switch lever which is configured as the manually operational member in Patent Document 1. In this manner, the degree of freedom of the switch lever is lowered and tilting of the switch lever is reduced.

CITATION LIST

Patent Document

Patent Document 1: Japanese Patent No. 3630966

SUMMARY OF THE INVENTION

Technical Problem

However, the formed wire spring of the handle of Patent Document 1 is configured to constantly bias the switch lever downward. Therefore, when a user grips and presses the switch lever in a left or right direction, the direction in which the user applies force differs from that in which the switch is actuated. In addition, when the posts of the switch lever move while being guided by the slots, the downward biasing force of the formed wire spring presses the slots each having a triangle shape downwardly and causes the posts and the slots to rub against each other. Consequently, the switch lever is not allowed to move smoothly, and is gripped and released against a heavy load. Thus, the switch is not responsive enough to allow a user to grip and release the switch lever smoothly and comfortably. Further, the handle of Patent Document 1 includes as many as four locations at which the combination of the post and the slot to limit the movement of the switch lever is provided. This adversely increases the resistance when the switch lever is gripped and released, and reduces the degree of freedom.

Another structure of the known art includes three helical compression springs provided at upper, right, and left locations so as to apply counter force in a direction in which the switch lever is returned. This structure has an increased number of parts and is more complicated. In addition, in this structure, a fall prevention member needs to be provided near each helical compression spring in order to prevent the helical compression spring from buckling.

It is therefore an object of the present invention to provide a switch lever which has a simple structure and may be pressed and released smoothly in substantially all directions.

Solution to the Problem

To achieve the above object, the present invention includes a spring having a pair of arms and configured to push a switch lever, and a plurality of limiters configured to limit movement of the switch lever.

Specifically, a first aspect of the present invention relates to a handle for an electric tool. The handle is mounted to an electric tool, provided with an on/off switch, and includes:

a switch lever including an operational portion having an inverted U-shape, and configured to press the on/off switch when the operational portion is gripped and pressed;

a handle body with the on/off switch mounted thereto, the handle body having an inner peripheral slit, and housing the switch lever such that the operational portion of the switch lever projects from the inner peripheral slit;

a spring having a supported portion and a pair of arms extending from the supported portion, housed in the handle body, and biasing and pushing the switch lever back; and a plurality of limiters provided at locations in either the handle body or the switch lever at a distance from the spring, and configured to limit movement of the switch lever.

The handle for the electric tool is configured such that when the operational portion is pressed, the spring is pushed to increase an angle between the pair of arms, and the on/off switch is pressed and turned on, and when the switch lever is released, the spring biases and pushes the switch lever back to a position under no gripping pressure, and the on/off switch is turned off.

This configuration including, as the basic components, the handle body, the switch lever, the on/off switch, and the spring, has a small number of parts and a simple structure. Further, the spring itself, which has a simple structure comprised of the supported portion and the pair of arms, is not only inexpensive, but also highly durable and easy to handle. The spring may be configured as a helical torsion spring having a helical portion, or a leaf spring having no helical portion. Since only the single spring and the plurality of limiters are used to limit the range of movement of the switch lever, the switch lever of the present invention has a greater degree of freedom of movement than in a case where multiple springs are used. Thus, the switch lever of the present invention has significantly improved ease of operation.

A second aspect of the present invention is an embodiment of the handle according to the first aspect, wherein the supported portion of the spring is supported on the handle body, and when the switch lever is under no gripping pressure, the pair of arms is positioned by being in contact with an arm catch provided to the handle body.

Specifically, suppose that a pair of arms of a spring was positioned by being in contact not with a handle body, but with a switch lever. If the switch lever was pressed obliquely to come into contact with only one of the pair of arms, the arms would turn until any one of them came into contact with an arm catch provided on the handle. Therefore, the arm angle would become unstable, which would destabilize a load with which the switch lever would return. In some cases, the switch lever could not return enough to turn the on/off switch off. In contrast, in the above configuration of the present invention, the arm angle is stabilized and the switch lever returns with a stable load. Thus, the switch lever may reliably returns to the original position under no gripping pressure.

A third aspect of the present invention is an embodiment of the handle according to the second aspect, wherein when the switch lever is gripped and pressed in a left or right direction, one of the pair of arms comes into contact with the arm catch and the other comes into contact with a pressed rib of the switch lever.

In this configuration, a load may be applied only to one of the arms at an efficient angle (for example, an angle approximate to the right angle) in accordance with the movement of the switch lever. Consequently, the switch lever moves smoothly and the ease of operation is improved.

A fourth aspect of the present invention is an embodiment of the handle according to any one of the first to third aspects, wherein the switch lever or the handle body, which is not provided with the plurality of limiters, has a plurality of guides each receiving an associated one of the limiters and each configured as a triangle opening or recess, and the switch lever is housed in the handle body such that movement of the switch lever is limited by allowing each of the plurality of limiters to move within the associated one of the guides.

In this configuration, even if the switch lever is gripped and pressed obliquely with respect to the direction in which the on/off switch is pressed, the range of movement of the switch lever is limited by allowing the limiter to move from the vertex to the base angle of the associated guide. Therefore, the switch lever is guided in the direction in which the on/off switch is pressed, and the on/off switch is suitably turned on and off, substantially irrespective of what portion of the operational portion is gripped and pressed.

A fifth aspect of the present invention is an embodiment of the handle according to the fourth aspect, wherein each of the guides has a vertex angle equal to or larger than the angle formed between the pair of arms of the spring when the switch lever is under no gripping pressure.

Specifically, if the angle formed between the pair of arms (arm angle) increased due to a gripping pressure applied to the switching lever in an oblique direction with respect to the pair of arms, the arm opposite to the oblique direction would also come into contact with the switch lever. Consequently, both the arms would be pushed up, and a load would be applied unstably. An increase in the arm angle would generate force to push the switch lever downward, which would impede smooth movement. As a result, the switch lever would be pressed or returned against a heavy load, and the switch would not be responsive enough to allow a user to grip and release the switch lever smoothly and comfortably. If the switch lever rubbed against the spring due to a gripping pressure applied obliquely, resistance would increase and the switch lever would be moved heavily. In contrast, in the configuration described above, the direction in which the spring applies a load may be limited by the vertex angle of the guide, and the frictional resistance may be kept low. As a result, the switch lever may be pressed and returned lightly, and smooth pressing and returning of the switch lever may be achieved.

A sixth aspect of the present invention is an embodiment of the handle according to the fourth or fifth aspect, wherein the triangle guides are provided at only two locations, and each of the limiters is allowed to move within the associated one of the guides.

In this configuration, since the number of the guides is minimized, the degree of freedom of movement of the switch lever increases, enabling a user to change his/her grip position on the handle easily. The handle according to this aspect has significantly improved ease of operation, as compared to those having a larger number of guides.

A seventh aspect of the present invention is an embodiment of the handle according to the sixth aspect, wherein the on/off switch is arranged at a location between the two guides and opposite to the spring.

With this configuration in which the spring, the pair of guides, and the on/off switch are arranged in a balanced manner, the on/off switch may be suitably pressed, substantially irrespective of what portion of the operational portion is gripped and pressed, and the pressed switch lever may reliably return to the position under no gripping pressure.

An eighth aspect of the present invention is an embodiment of the handle according any one of the first to seventh aspects, wherein the handle body is in a continuous loop shape, and has a switch-pressing portion configured to press the on/off switch and arranged at a location opposite to the spring.

Forming the switch lever in a loop shape as described above not only achieves a decrease in the number of parts and an increase in the strength, but also promotes ease of assembly. Gripping and pressing the inverted U-shaped operational portion of the loop-shaped switch lever causes the switch-pressing portion, which is formed on the switch lever arranged inside the inner peripheral slit, to press the on/off switch reliably.

A ninth aspect of the present invention is an embodiment of the handle according any one of the first to eighth aspects, wherein when the switch lever is under no gripping pressure, a gap is ensured between the pair of arms and the switch lever, or the switch lever is in contact with the pair of the arms to an extent that the pair of arms does not bias the switch lever.

With this configuration, the switch lever may be pressed and returned lightly. The switch lever may be returned smoothly to the position under no gripping pressure. Note that "to an extent that the pair of arms does not bias the switch lever" refers to a state where no biasing force is applied intentionally and no gap is formed.

A tenth aspect of the present invention relates to an electric tool including the handle of any one of the first to ninth aspects.

According this aspect, an electric tool is obtained which is simply structured and inexpensive, and has a switch lever that is easy to operate in substantially all directions. Thus, the electric tool according to this aspect has an enhanced marketability.

An eleventh aspect of the present invention is an embodiment of the electric tool according the tenth aspect, wherein the electric tool is configured as a hedge trimmer including the handle implemented as a front handle.

The switch lever of the hedge trimmer according to this aspect is highly responsive and comfortable to grip and release when the blade of the hedge trimmer is oriented in substantially any direction, thereby contributing to significant improvement of the workability.

Advantages of the Invention

As can be seen, according to the present invention, when the inverted U-shaped operational portion of the switch lever is gripped and pressed, the spring is pressed to increase the angle between the pair of arms, and the on/off switch is pressed and turned on. When the switch lever is released, the spring biases and pushes the switch lever back to a position under no gripping pressure, and the on/off switch is turned off. The handle of the present invention has a simple structure and allows the switch lever to be pressed smoothly in substantially all directions.

BRIEF DESCRIPTION OF THE DRAWINGS

FIG. 6 is a front view corresponding to FIG. 1 and illustrating the switch lever gripped and pressed upward. FIG. 6 also shows a portion of the switch lever on an enlarged scale.

DESCRIPTION OF EMBODIMENTS

Embodiments of the present invention will be described below with reference to the drawings.

Figure 2:
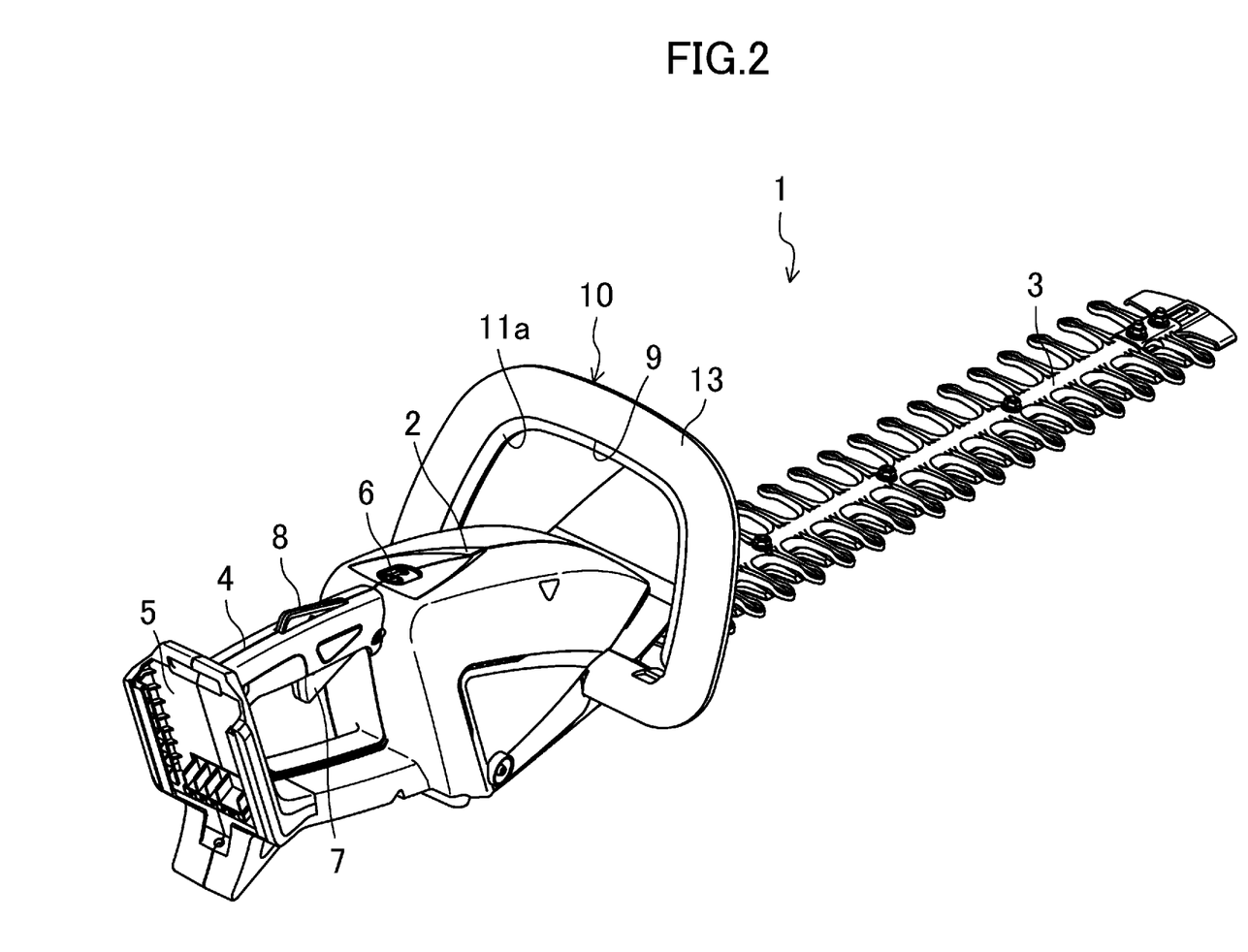
FIG. 2 is a perspective view illustrating a hedge trimmer according to an embodiment of the present invention.

FIG. 2 illustrates a hedge trimmer 1 according to an embodiment of the present invention. This hedge trimmer 1 includes a casing 2 housing therein an electric motor (not shown). The hedge trimmer 1 further includes a blade 3 extending from a front portion of the casing 2 and driven by the electric motor. A rear handle 4 is provided at a rear portion of the casing 2. The rear handle 4 has, at its rear end, a battery-attaching portion 5 to which a battery (not shown) is attached. A main switch 6 is provided on a rear portion of the upper surface of the casing 2. The power is turned on and off via this main switch 6.

Although not illustrated, the casing 2 includes therein a variable switch (a rotation regulating switch) provided at an upper rear end portion of the casing 2. This variable switch is controlled via a trigger lever 7 such that the rotation of the electric motor is regulated according to a degree at which the trigger lever 7 is gripped and pressed. The trigger lever 7 is locked by an unlocking lever 8 when the variable switch is at an off position. A user may actuate the trigger lever 7 while gripping the unlocking lever 8 provided on the upper surface of the rear handle 4.

As illustrated in FIGS. 1 and 3-6, a handle for an electric tool, which is configured as a front handle 10, is fixed to a front portion of the casing 2. This front handle 10 has a substantially symmetric trapezoidal loop shape, and includes a switch lever 11 provided inside the front handle 10. The switch lever 11 has an operational portion 11a having an inverted U-shape. The switch lever 11 is configured to press an on/off switch 12 when the operational portion 11a is gripped and pressed. The on/off switch 12 is mounted on a lower side of a handle body 13. The switch lever 11 is made of a resin molding having a loop shape, for example. The switch lever 11 is housed in the handle body 13 such that the operational portion 11a projects from an inner peripheral slit 9 of the handle body 13 (see FIG. 2). The outer periphery of the switch lever 11 is open to improve ease in molding and to reduce the weight. Forming the switch lever 11 in a loop shape not only achieves a decrease in the number of parts and an increase in the strength, but also promotes ease of assembly.

For example, the handle body 13 is composed of two separate front and rear parts, i.e., a rear body 13a and a front body 13b. Each of the rear and front bodies 13a and 13b is made of a resin molding, for example. A switch housing 13c is provided to house the on/off switch 12. The switch housing 13c is also composed of two front and rear parts, i.e., a rear half provided on a lateral middle portion of the lower side of the rear body 13a, and a front half provided on a lateral middle portion of the lower side of the front body 13b. The on/off switch 12 has a lever 12a which pivots upon contact and projects downwardly inside the handle body 13. The lever 12a is configured to be pressed by a switch-pressing portion 11b having a pin shape and provided on the rear surface of a lateral middle portion of the lower side of the switch lever 11. The handle body 13 having the switch lever 11 housed therein is mounted to the casing 2 such that the lower side of the handle body 13 is arranged inside a front portion of the casing 2, thereby preventing water or other foreign matter from entering the on/off switch 12 and its vicinity. The front body 13b is provided with a guard 13d extending frontward. However, the guard 13d may be omitted.

Figure 1:
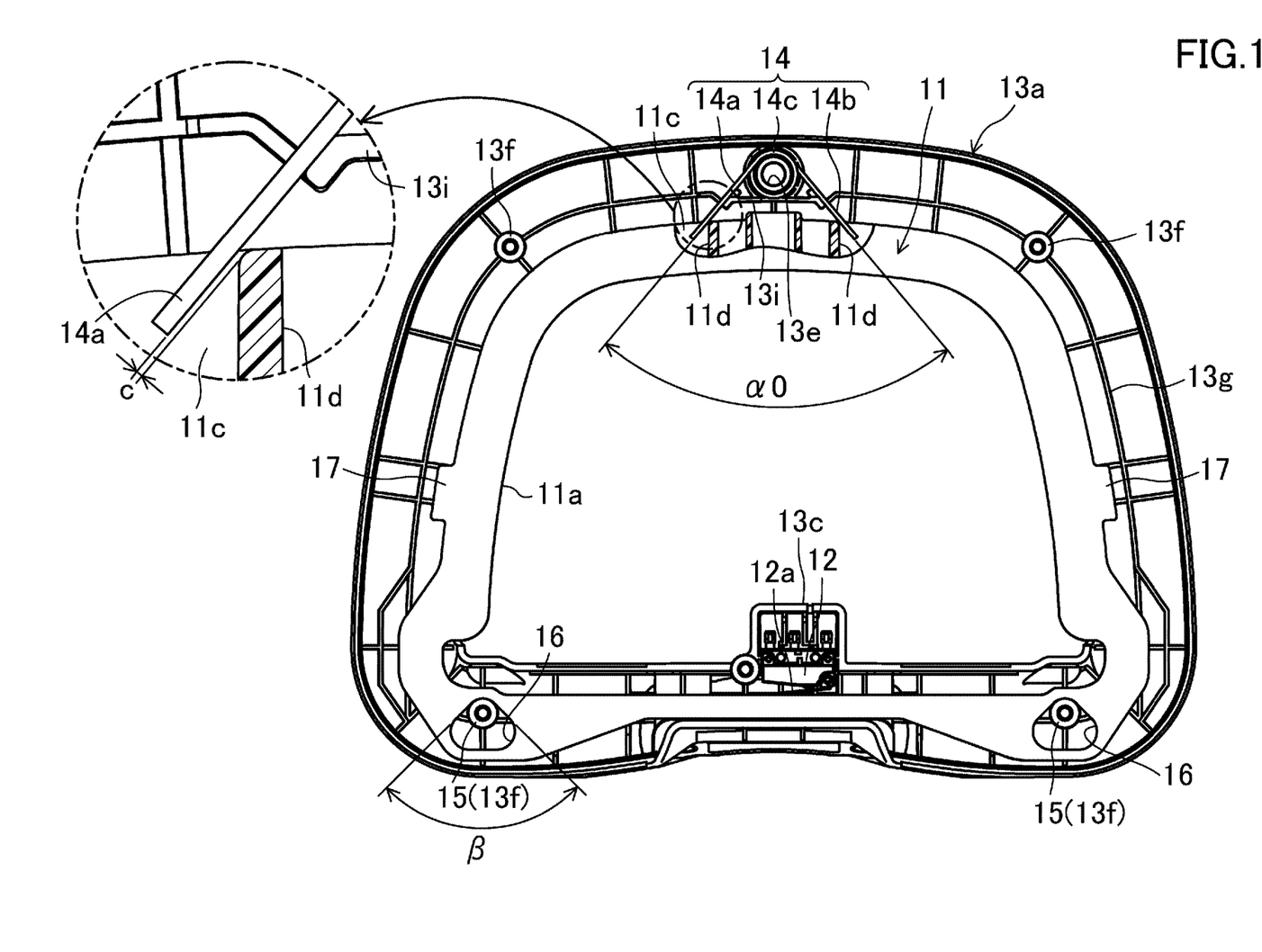
FIG. 1 is a front view illustrating a switch lever in an assembled state.
Figure 5:
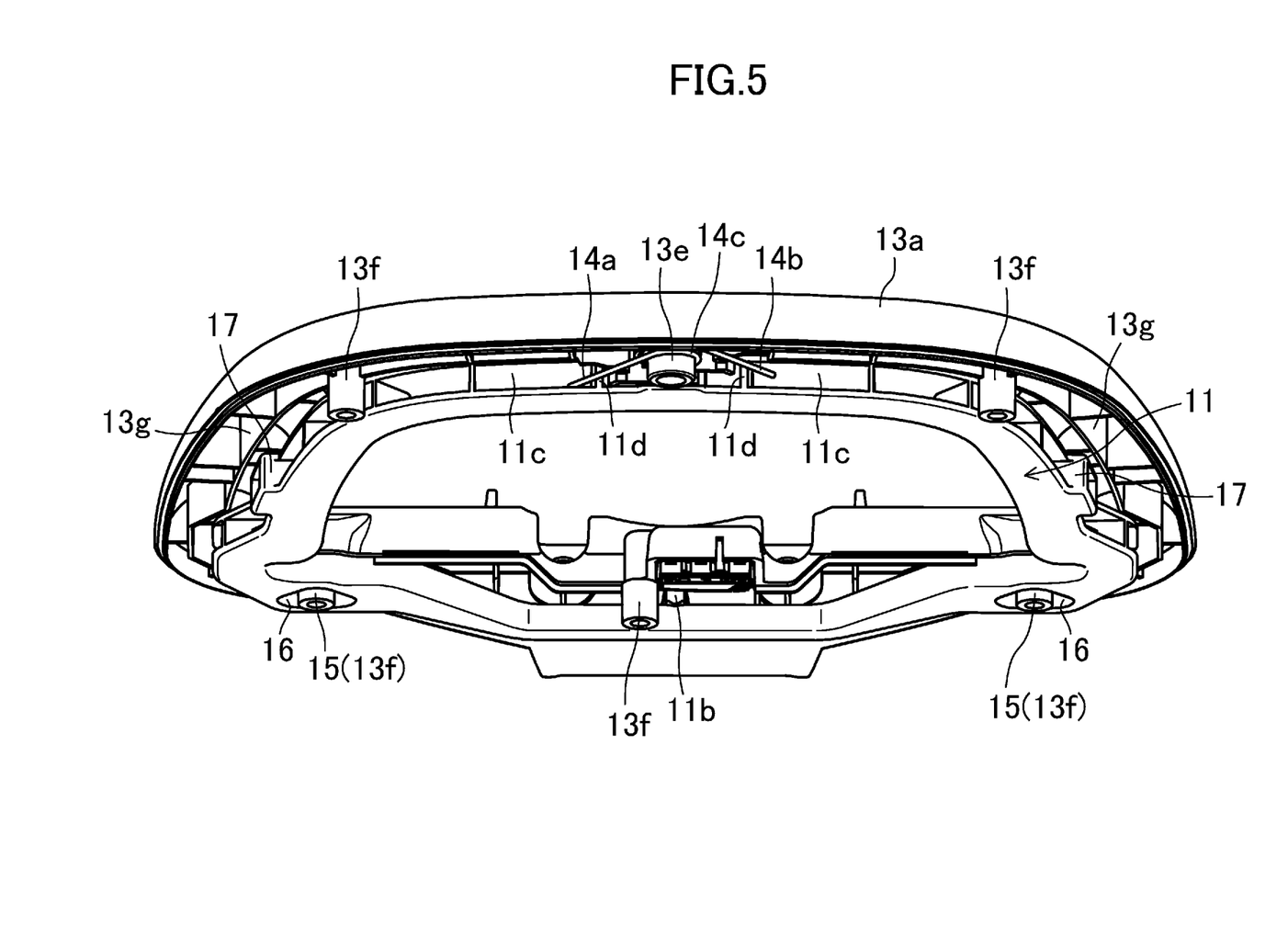
FIG. 5 is a perspective view illustrating a switch lever and a helical torsion spring in an assembled state.

A cylindrical boss 13e for a spring stands on a lateral middle portion of the upper side of the rear body 13a. A helical torsion spring 14 having a pair of arms 14a and 14b is pivotably fitted, at a helical portion 14c of the spring 14, on the outer periphery of the boss 13e for a spring. The helical portion 14c functions as a supported portion of the helical torsion spring 14. As illustrated in FIGS. 1 and 5, the pair of arms 14a and 14b has their tip ends inserted in recesses 11c formed in the upper end of the switch lever 11. When the switch lever 11 is under no gripping pressure, the pair of arms 14a and 14b is in contact with an arm catch 13i formed in the rear body 13a, thereby positioning the helical torsion spring 14. For example, the arm catch 13i has portions which each come into contact with an inner side of an associated one of the pair of arms 14a and 14b. The arm catch 13i determines an arm angle α0 (shown only in FIG. 1) which is formed when the switch lever 11 is under no gripping pressure. For example, the angle α0 is set to be 80°, which is slightly larger than an angle formed when the helical torsion spring 14 is under no load (free of load). This angle setting may stabilize the helical torsion spring 14. The arm catch 13i is configured to prevent the helical torsion spring 14 from turning unstably, by coming into contact with at least one of the pair of arms 14a and 14b. When the switch lever 11 is pressed, at least one of the pair of arms 14a and 14b comes into contact with an associated one of pressed ribs 11d each forming the left or right sidewall of the associated recess 11c, thereby pushing the switch lever 11 back.

The handle body 13 further includes a pair of limiters 15 provided in its lower right and lower left locations at a distance from the helical torsion spring 14. In this embodiment, each of the pair of limiters 15 is configured as a coupling boss 13f which couples the rear body 13a to the front body 13b. The on/off switch 12 is provided at a lateral middle portion between the pair of limiters 15 and opposite to the helical torsion spring 14. The pair of limiters 15 each come into contact with the inner surface of an associated one of guides 16 configured as triangle openings (through holes) formed at lower right and lower left locations of the switch lever 11, thereby limiting the movement of the switch lever 11.

The switch lever 11 has protrusions 17 each protruding from a vertical middle portion of the outer surface of an associated one of the right and left sides of the switch lever 11. The rear body 13a has a lever-receiving rib 13g which stands to surround the switch lever 11. When one of the protrusions 17 comes into contact with the lever-receiving rib 13g, the switch lever 11 is prevented from moving further to the right or left. The protrusions 17, which function as auxiliary limiters to limit the movement of the switch lever 11, may be omitted. Each guide 16 has a vertex angle β which is equal to or larger than the arm angle α0 formed between the pair of arms 14a and 14b of the helical torsion spring 14 when the switch lever 11 is under no gripping pressure. For example, if the arm angle α0 under no gripping pressure is 80°, the angle β is set to be 90° (α0=80°, β=90°). In this embodiment, each guide 16 has the shape of an isosceles triangle having a height about twice as large as a stroke of the switch lever 11 in the lateral direction. The shape of each guide 16 is not limited to the isosceles triangle described above.

Figure 3:
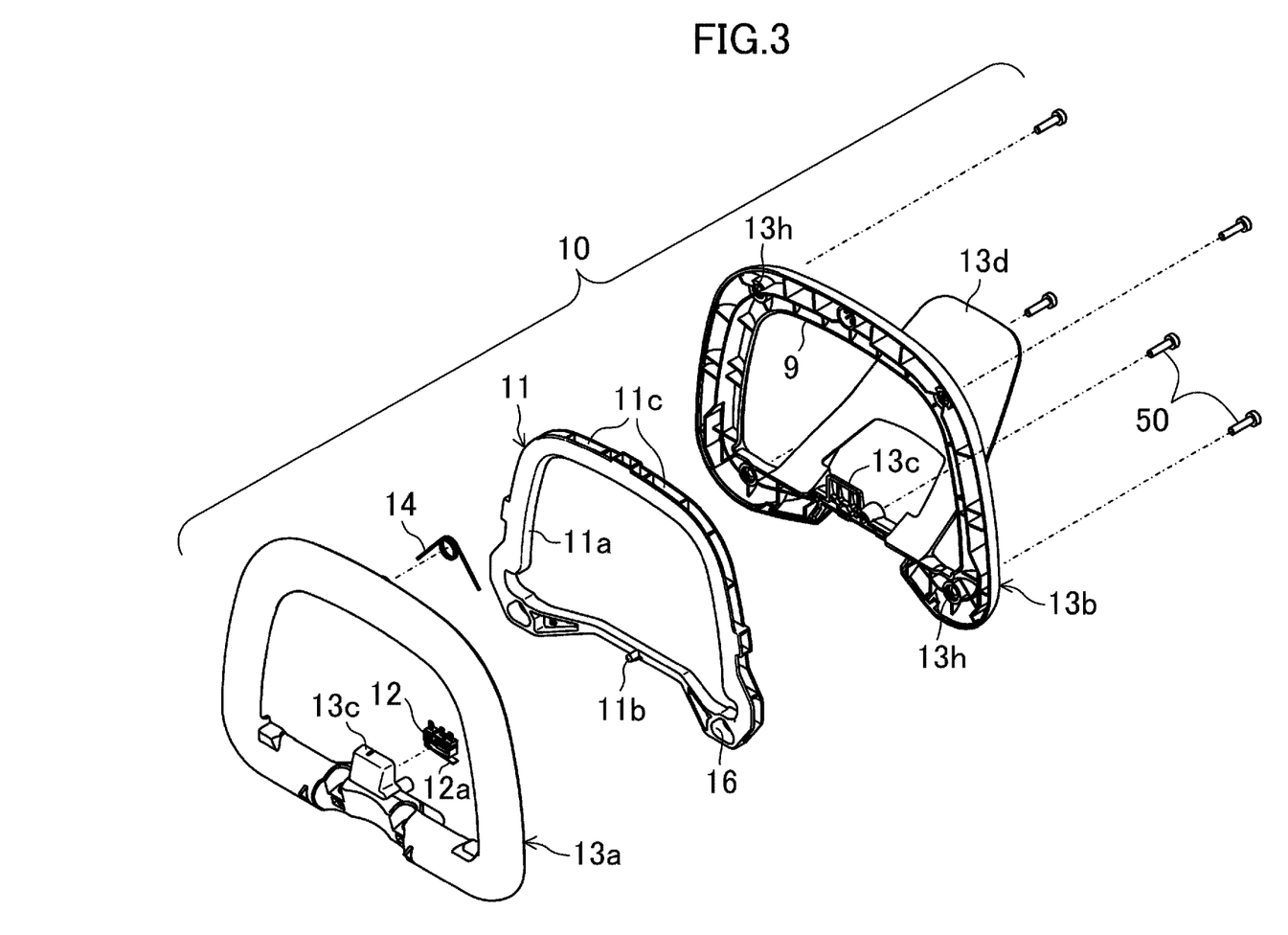
FIG. 3 is an exploded perspective view illustrating a handle for a hedge trimmer, as viewed from the rear.
Figure 4:
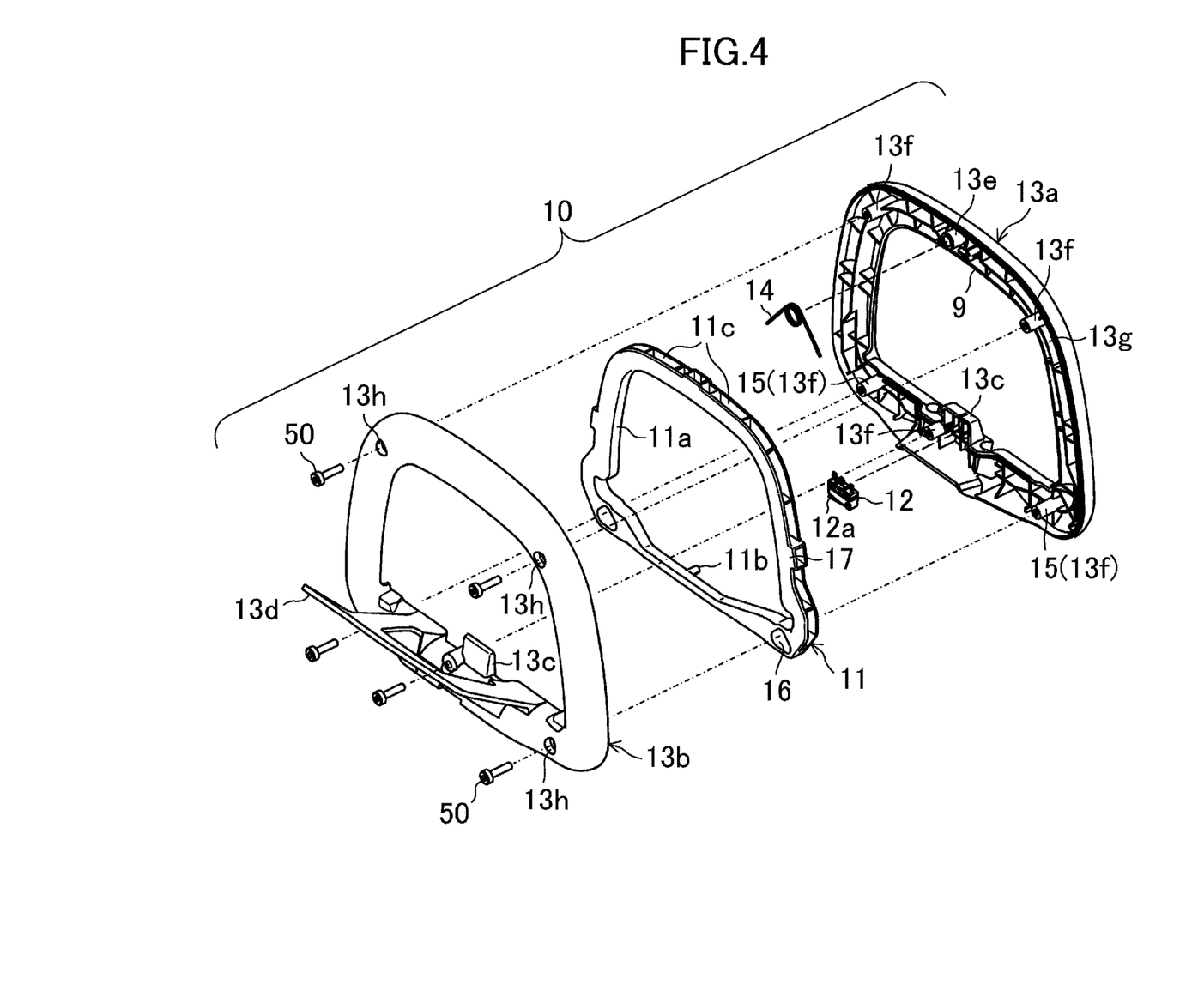
FIG. 4 is an exploded perspective view illustrating a handle for a hedge trimmer, as viewed from the front.

As illustrated in FIGS. 3 and 4, the front body 13b has bolt insertion holes 13h corresponding to the coupling bosses 13f. Bolts 50 are inserted into the bolt insertion holes 13h and fastened to the coupling bosses 13f, thereby coupling the rear body 13a to the front body 13b. Two of the coupling bosses 13f also function as the limiters 15 that limit, in cooperation with the guides 16, the movement of the switch lever 11. This configuration contributes to a saving in space and a decrease in weight.

As can be seen, the hedge trimmer 1 is configured such that: when a user grips and presses the operational portion 11a of the switch lever 11, the helical torsion spring 14 is pushed to increase the arm angle α between the pair of arms 14a and 14b of the helical torsion spring 14 and the on/off switch 12 is pressed and turned on; and when the user releases the switch lever 11, the helical torsion spring 14 biases and returns the switch lever 11 to the original position under no gripping pressure, thereby turning the on/off switch 12 off.

—How to Use Hedge Trimmer—

Next, it is described how to use the hedge trimmer 1 according to this embodiment.

First, after attaching a battery to the battery-attaching portion 5, the main switch 6 is pressed to turn the power on.

As shown on an enlarged scale in FIG. 1, when the switch lever 11 is under no gripping pressure, the arm catch 13i pushes the pair of arms 14a and 14b away from each other. Consequently, a slight gap c is ensured between each of the pair of arms 14a and 14b and the associated pressed rib 11d of the switch lever 11. Note that the switch lever 11 may be in contact with the pair of arms 14a and 14b to the extent that the pair of arms 14a and 14b does not bias the switch lever 11.

Next, the trigger lever 7 of the rear handle 4 and the switch lever 11 of the front handle 10 are gripped and pressed to rotate the electric motor. At this time, the rotation of the electric motor is regulated via the trigger lever 7. The rotation of the electric motor may be stopped via either the switch lever 11 or the rear handle 4.

While holding the front handle 10, a user tilts the hedge trimmer 1 to the left or right in order to orient the blade 3 in a desired working direction. Therefore, the switch lever 11 may be gripped and pressed in the upward, right, and left directions.

Figure 6:
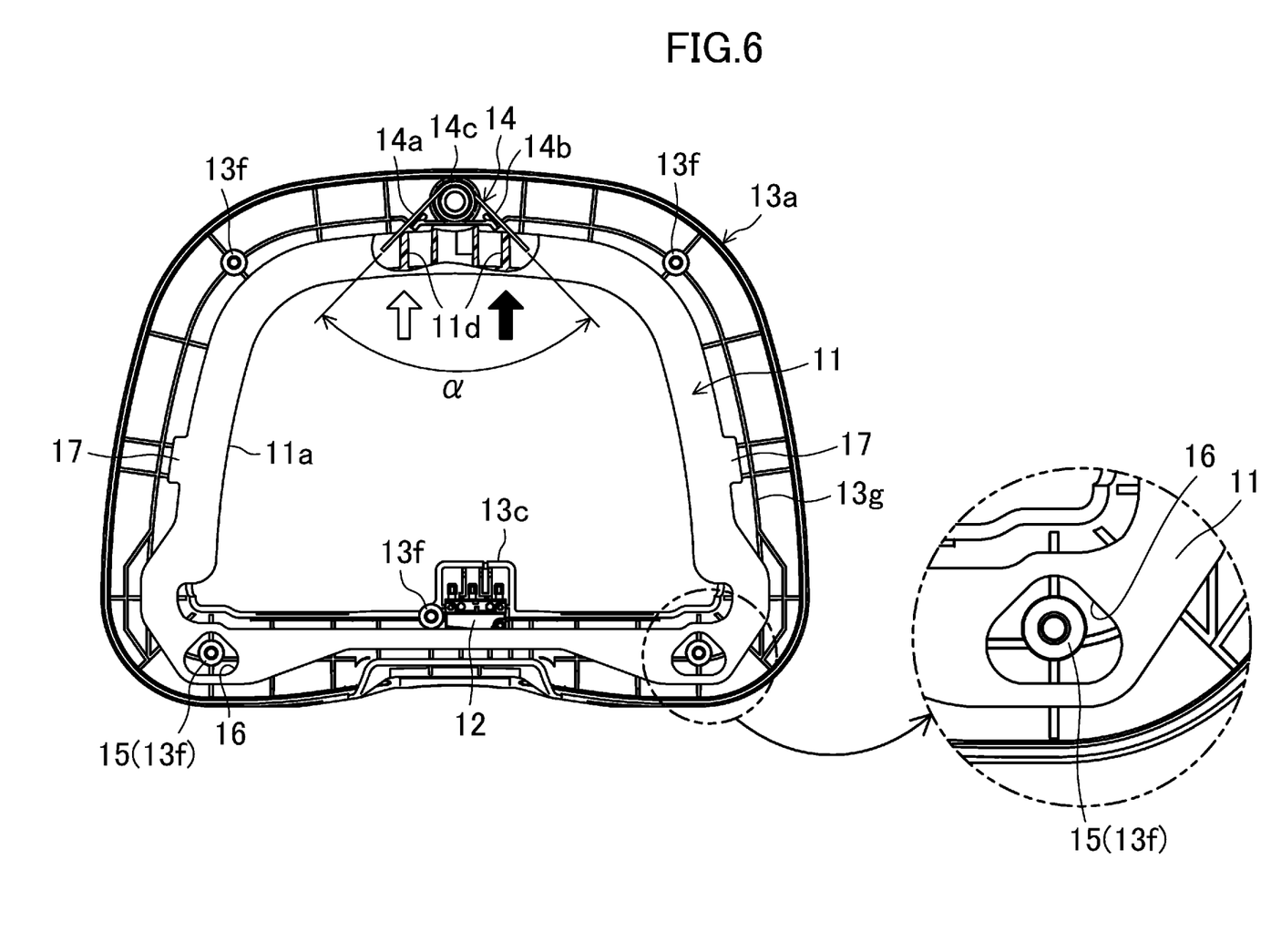

As shown in FIG. 6, when the user applies a gripping pressure in a vertically upward direction indicated by the solid arrow, the upper side of the inverted U-shaped operational portion 11a of the loop-shaped switch lever 11 is pressed in the vertically upward direction, and consequently, the switch lever 11 is also moved in the direction indicated by the hollow arrow. Each of the pair of left and right limiters 15 is out of contact with the inner surface of the associated guide 16. The pair of arms 14a and 14b is pushed by the left and right pressed ribs 11d, and consequently, the arm angle α increases (α>α0). The switch-pressing portion 11b of the switch lever 11 then rises and presses the lever 12a of the on/off switch 12 to turn the on/off switch 12 on. Each of the pair of left and right limiters 15 is kept out of contact with the inner surface of the associated guide 16, and space is ensured. As a result, the user may tilt the hedge trimmer 1 to the left or the right, while holding the operational portion 11a, and may press and release the operational portion 11a smoothly.

Figure 7:
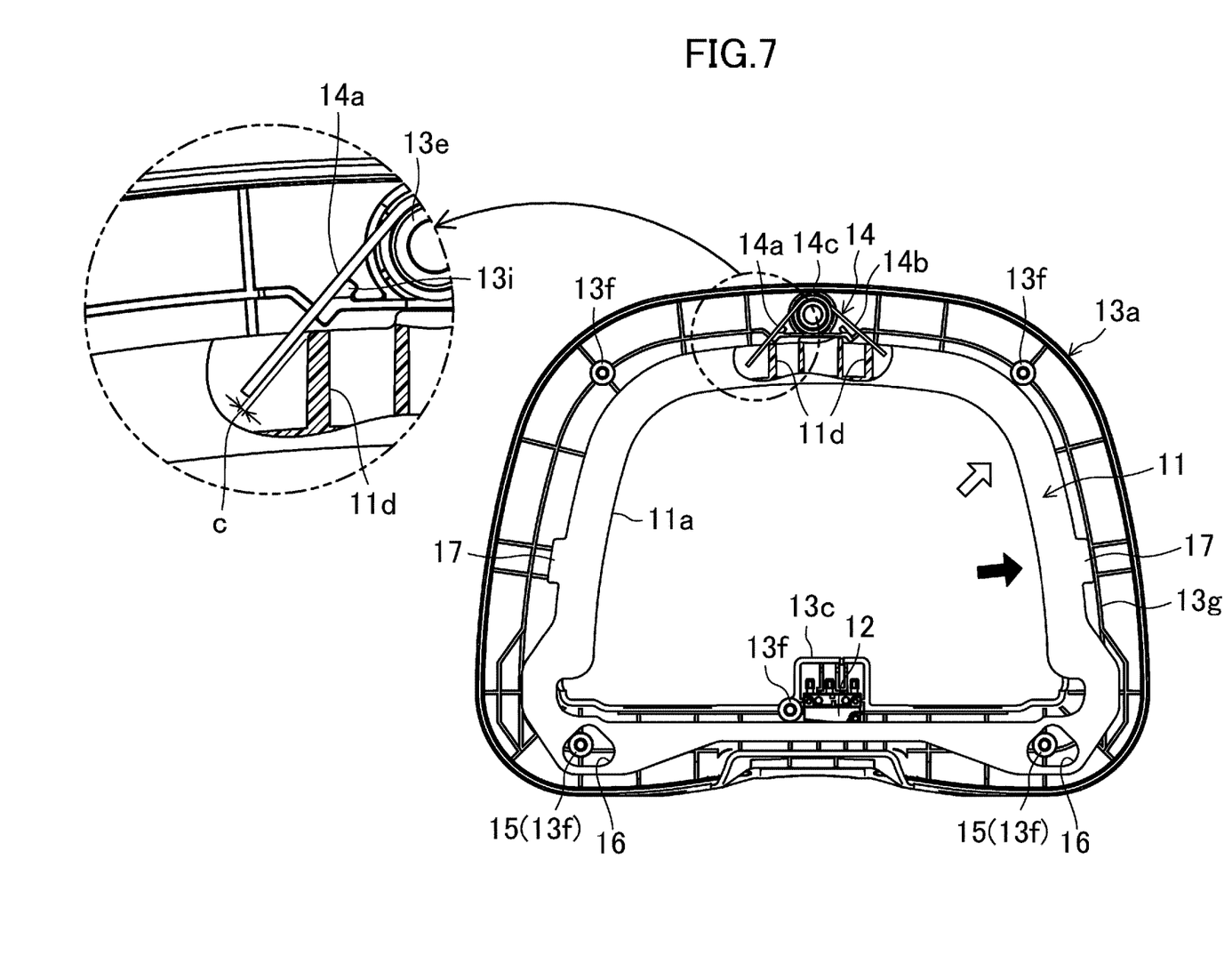
FIG. 7 is a front view corresponding to FIG. 6 and illustrating the switch lever gripped and pressed rightward.

As illustrated in FIG. 7, when the user applies a gripping pressure in a right direction as viewed from the front, i.e., in the direction indicated by the solid arrow, the right side of the inverted U-shaped operational portion 11a of the loop-shaped switch lever 11 is pressed in the right direction. Each limiter 15 then comes into contact with an upper left portion of the inner surface of the associated guide 16 and moves along the triangle shape, thereby causing the switch lever 11 to move in an upper right direction indicated by the hollow arrow. The right protrusion 17 then comes into contact with a right portion of the lever-receiving rib 13g. The right arm 14b of the pair of arms 14a and 14b comes into contact with, and is pushed up by, the associated pressed rib 11d. Since the vertex angle β of each guide 16 is equal to or larger than the arm angle α0 under no gripping pressure, the gap c between the left arm 14a and the associated pressed rib 11d remains unchanged or increases as the switch lever 11 moves, as shown on an enlarged scale in FIG. 7. As can be seen, the left arm 14a is not allowed to come into contact with the associated pressed rib 11d.

In the configuration as described above, while the arm angle α increases, the switch-pressing portion 11b of the switch lever 11 rises to press the lever 12a of the on/off switch 12, thereby turning the on/off switch 12 on.

Setting the arm angle α0 under no gripping pressure to be an angle equal or approximate to the vertex angle β of the guide 16 enables the load of the switch lever 11 to be received approximately perpendicularly to the right arm 14b. As a result, friction between each guide 16 of the switch lever and the associated limiter 15 generated by reaction force of the spring may be reduced, and consequently, the movement of the switch lever 11 is smoothed.

Figure 8:
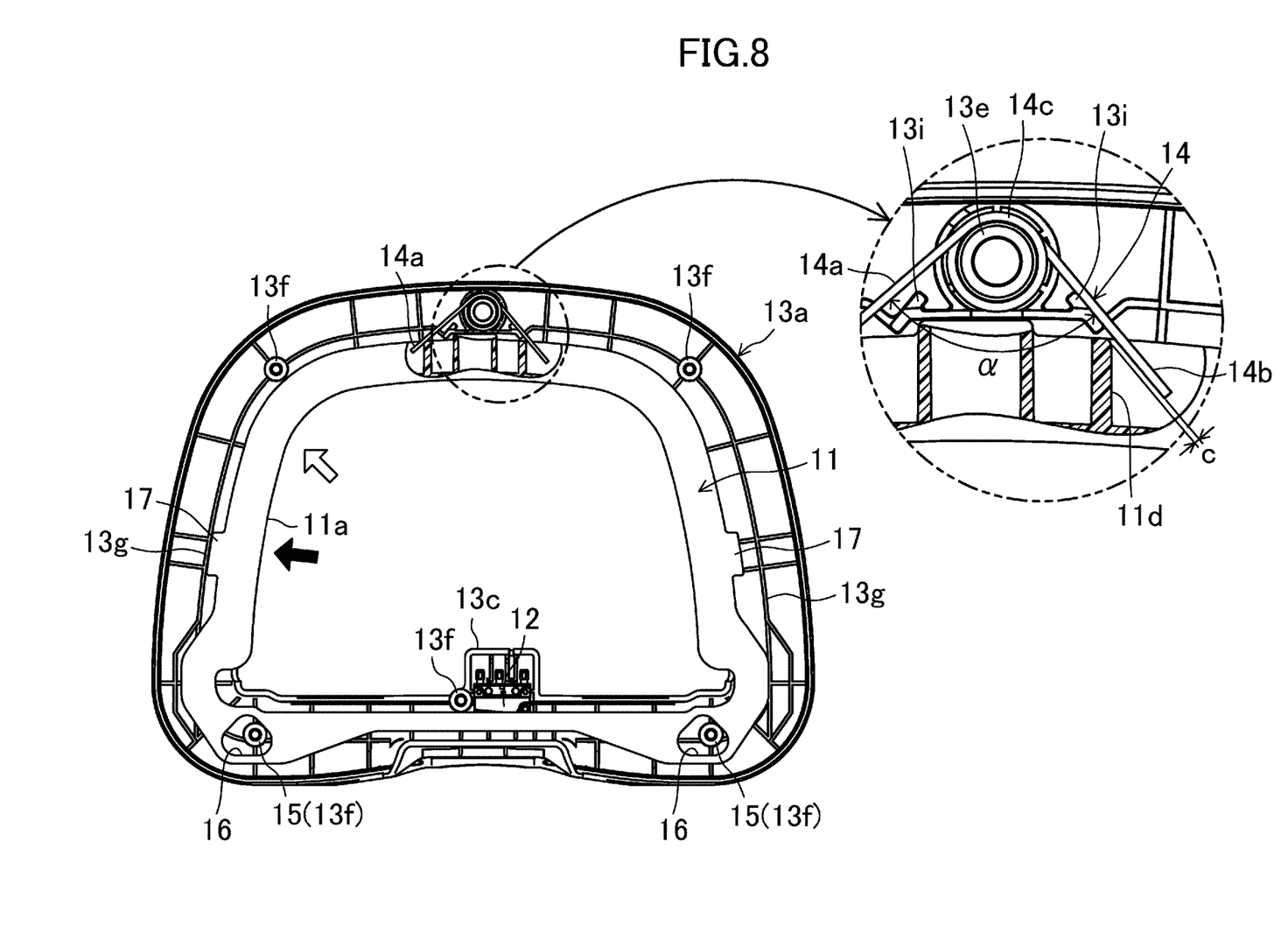
FIG. 8 is a front view corresponding to FIG. 6 and illustrating the switch lever gripped and pressed leftward.

Conversely, as illustrated in FIG. 8, when the user applies a gripping pressure in a left direction as viewed from the front, i.e., in the direction indicated by the solid arrow, each limiter 15 comes into contact with an upper right portion of the inner surface of the associated guide 6 and moves along the triangle shape, and the left side of the inverted U-shaped operational portion 11a of the loop-shaped switch lever 11 is pressed in the left direction, thereby causing the switch lever 11 to move in an upper left direction indicated by the hollow arrow. Each of the pair of left and right limiters 15 comes into contact with the right side of the associated guide 16, or the left protrusion 17 comes into contact with a left portion of the lever-receiving rib 13g. The left arm 14a of the pair of the arms 14a and 14b comes into contact with, and is pushed up by, the associated pressed rib 11d. Since the vertex angle β of each guide 16 is equal to or larger than the arm angle α0 under no gripping pressure, the gap c between the right arm 14b and the associated pressed rib 11d remains unchanged or increases as the switch lever 11 moves, as shown on an enlarged scale. As can be seen, the right arm 14b is not allowed to come into contact with the associated pressed rib 11d.

In the configuration as described above, while the arm angle α increases, the switch-pressing portion 11b of the switch lever 11 rises to press the lever 12a of the on/off switch 12, thereby turning the on/off switch 12 on.

Setting the arm angle α0 under no gripping pressure to be an angle equal or approximate to the vertex angle β of the guide 16 enables the load of the switch lever 11 to be received approximately perpendicularly to the left arm 14a.

Figure 9:
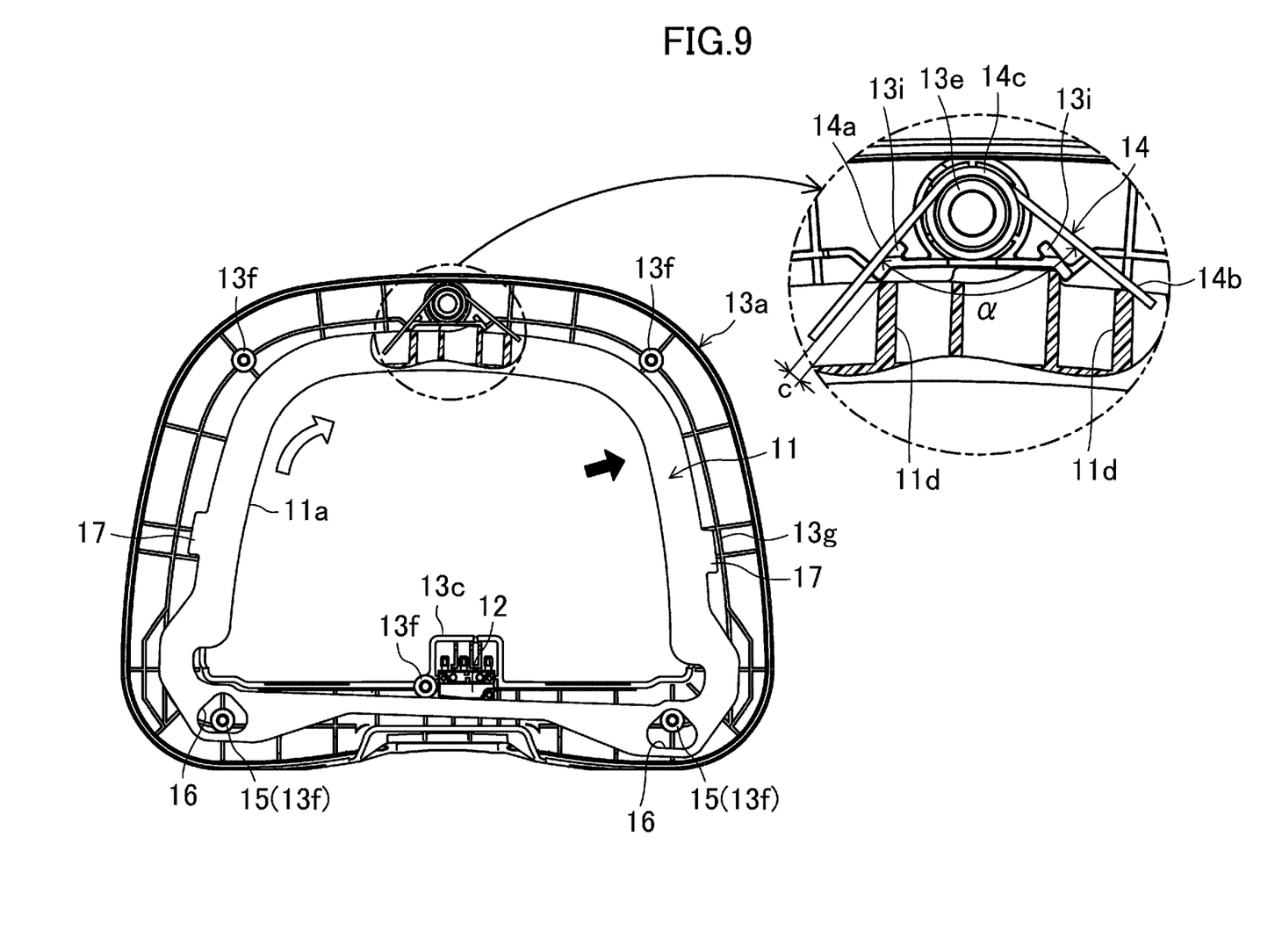
FIG. 9 is a front view corresponding to FIG. 6 and illustrating the switch lever that is moved in a clockwise direction by being gripped at an upper right portion.

As illustrated in FIG. 9, when the user applies a gripping pressure in an upper right direction as viewed from the front, i.e., in the direction indicated by the solid arrow, the switch lever 11 moves to turn in the clockwise direction indicated by the hollow arrow. Specifically, the switch lever 11 moves to turn about the right limiter 15, which is kept in contact with the vertex of the right guide 16, until the left limiter 15 comes into contact with the base of the left guide 16. The right arm 14b of the pair of the arms 14a and 14b comes into contact with, and is pushed up by, the associated pressed rib 11d, whereas a gap c is ensured between the left arm 14a and the associated pressed rib 11d. While the arm angle α increases, the switch-pressing portion 11b of the switch lever 11 rises to press the lever 12a of the on/off switch 12, thereby turning the on/off switch on.

Figure 10:
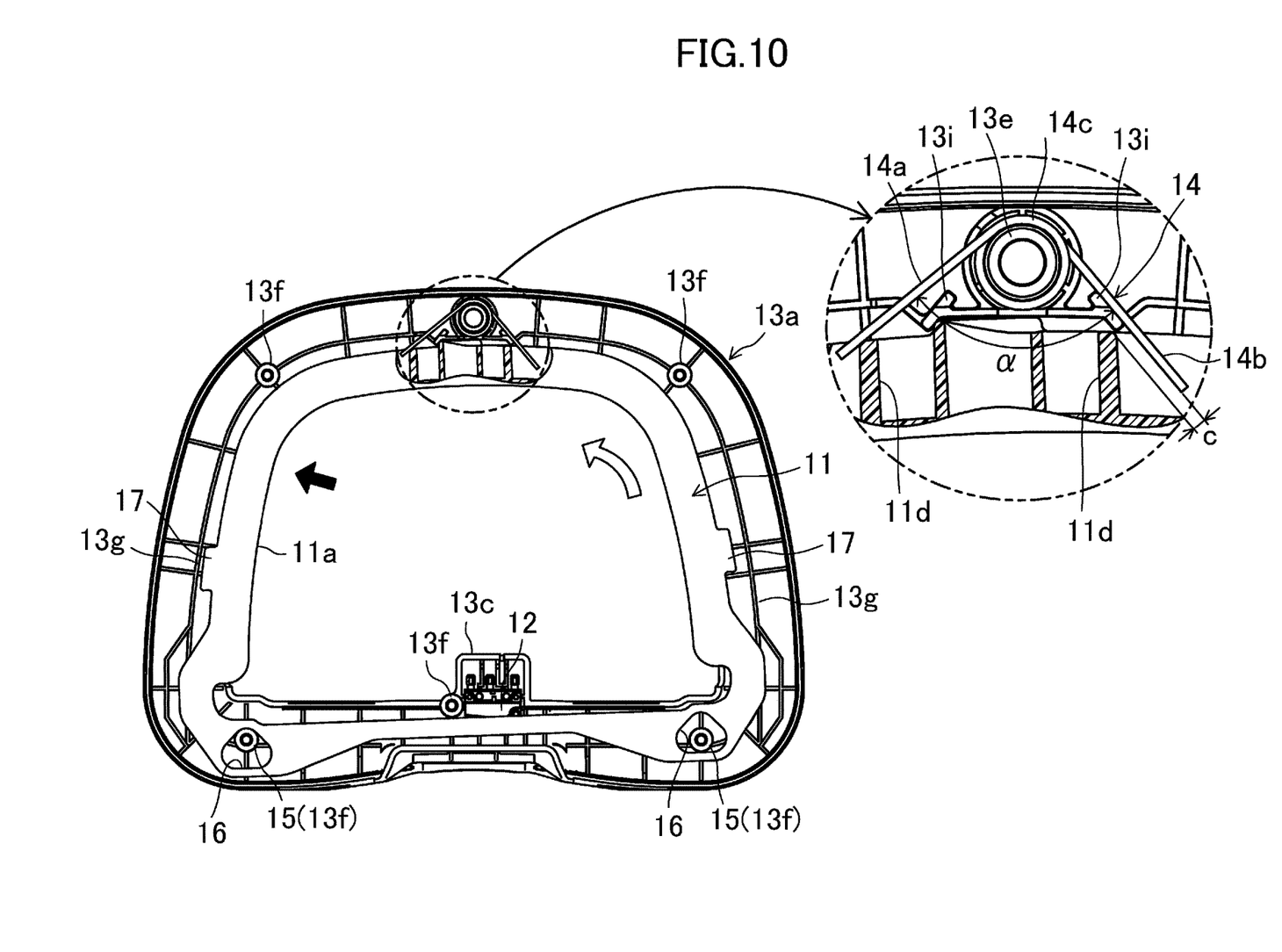
FIG. 10 is a front view corresponding to FIG. 6 and illustrating the switch lever that is moved in a counterclockwise direction by being gripped at an upper left portion.

Conversely, as illustrated in FIG. 10, when the user applies a gripping pressure in an upper left direction as viewed from the front, i.e., in the direction indicated by the solid arrow, the switch lever 11 moves to turn in the counterclockwise direction indicated by the hollow arrow. Specifically, the switch lever 11 moves to turn about the left limiter 15, which is kept in contact with the vertex of the left guide 16, until the right limiter 15 comes into contact with the base of the right guide 16. The left arm 14a of the pair of the arms 14a and 14b comes into contact with, and is pushed up by, the associated pressed rib 11d, whereas a gap c is ensured between the right arm 14b and the associated pressed rib 11d. While the arm angle α increases, the switch-pressing portion 11b of the switch lever 11 rises to press the lever 12a of the on/off switch 12, thereby turning the on/off switch on. Note that the switch lever 11 may be in contact with the pair of the arms 14a and 14b to the extent that the pair of arms 14a and 14 does not bias the switch lever 11.

Being configured to have as great a degree of freedom as possible, the switch lever 11 of this embodiment may make circular motion as illustrated in FIGS. 9 and 10. However, since the height of the triangle of each guide 16 is about twice as large as the necessary stroke of the switch lever 11 in the lateral direction, even when making circular motion, the switch lever 11 may be reliably guided upward to press the on/off switch 12.

As can be seen, when the user applies a gripping pressure in the vertically upward direction as illustrated in FIG. 6, the pair of arms 14a and 14b together bias and push the switch lever 11 back. When the user applies a gripping pressure not in the vertically upward direction, but in the right or left direction as illustrated in FIGS. 7 to 10, either of the pair of arms 14a and 14b biases and pushes the switch lever 11 back. This configuration allows the arm angle α to vary only slightly even under gripping pressures applied in different directions. Thus, the load against which the switch lever 11 is gripped and pressed is at substantially the same level in all of the upward, right, and left directions. As a result, the ease of use of the hedge trimmer 1 is improved significantly.

When the user applies a gripping pressure in the right or left direction, the load of the switch lever 11 may be received approximately perpendicularly to the arm 14a or 14b, which biases and pushes the switch lever 11 back. Consequently, the user may press and release the switch lever 11 lightly, and the switch lever 11 may return to its original position smoothly.

For example, if the arm angle between the pair of the arms increased due to a gripping pressure applied, in an oblique direction with respect to the pair of arms, to the switching lever, and therefore, to one of the pair of arms, the opposite arm would also come into contact with the switch lever. Consequently, both the arms would be pushed up, and a load would be applied unstably. If the switch lever rubbed against the helical torsion spring due to a gripping pressure applied obliquely, resistance would increase and the switch lever would be moved heavily. If the pair of arms formed an angle at which the arms pushed the switch lever downwardly, the friction between the switch lever and the handle body would increase, and consequently, the handle would be operated heavily and return slowly. In contrast, according to this embodiment, since the vertex angle β of each guide 16 is set to be equal to or larger than the arm angle α formed between the pair of arms 14a and 14b of the helical torsion spring 14 when the switch lever 11 is under no gripping pressure, the direction in which the helical torsion spring 14 applies a load may be limited by the vertex angle β of each guide 16, and the frictional resistance may be kept low. As a result, the switch lever 11 may be pressed and returned lightly, and smooth return of the switch lever 11 may be achieved.

For example, suppose that a pair of arms of a helical torsion spring was positioned by coming into contact with a switch lever. If the switch lever was pressed obliquely with respect to the pair of arm, the pair of arms would turn until the arms came into contact with an arm catch of the switch lever. Therefore, the arm angle would become unstable, which would destabilize a load with which the switch lever would return. In some cases, the switch lever could not return enough to turn the on/off switch off. In contrast, according to this embodiment, as illustrated in FIGS. 1 and 7-10, since the gap c may be ensured between at least one of the pair of arms 14a and 14b of the helical torsion spring 14 and the associated pressed rib 11d of the switch lever 11, the switch lever 11 may stably and reliably return to the position under no gripping pressure. Note that the switch lever 11 may be in contact with the pair of the arms 14a and 14b to the extent that the pair of arms 14a and 14 does not bias the switch lever 11.

As can be seen, since the switch lever 11 is highly responsive and comfortable to grip and release when the blade 3 is oriented in substantially all directions, the workability of the hedge trimmer 1 is improved significantly.

According to this embodiment in which the helical torsion spring 14, the pair of limiters 15, and the on/off switch 12 are arranged in a balanced manner, the on/off switch 12 may be suitably pressed, substantially irrespective of what portion of the operational portion 11a of the switch lever 11 is gripped and pressed, and the pressed switch lever 11 may reliably return to the position under no gripping pressure.

This embodiment including, as the basic components, the handle body 13, the switch lever 11, the on/off switch 12, and the helical torsion spring 14, has a small number of parts and a simple structure. Further, the helical torsion spring 14 itself, which has a simple structure comprised of the helical portion 14c and the pair of arms 14a and 14b, is not only inexpensive, but also highly durable and easy to handle. In this embodiment, the range in which the switch lever 11 is allowed to move is limited only by the single helical torsion spring 14 and the pair of limiters 15 (the guides 16). Therefore, the degree of freedom of the movement of this embodiment is higher than the configuration of the known art including multiple helical torsion springs, or limiting the movement by means of four limiters. Thus, the switch lever 11 of this embodiment has significantly improved ease of operation.

Even if the switch lever 11 is pressed obliquely with respect to the pair of arms 14a and 14b, the range of movement of the switch lever 11 is limited by allowing the limiter 15 to move toward the vertex of the associated guide 16. Therefore, the on/off switch 12 is suitably turned on and off, substantially irrespective of what portion of the operational portion 11a is gripped and pressed.

Since this embodiment includes the triangle guides 16 provided at a minimum number of locations, i.e., two locations, the degree of freedom of movement of the switch lever 11 increases, enabling the user to change his/her grip position on the handle easily. The handle according to this embodiment thus has significantly improved ease of operation, as compared to those of the known art having a larger number of guides.

Thus, the hedge trimmer 1 according to this embodiment has the switch lever 11 that can be gripped and pressed smoothly in substantially all directions.

—Variation—

Figure 11:
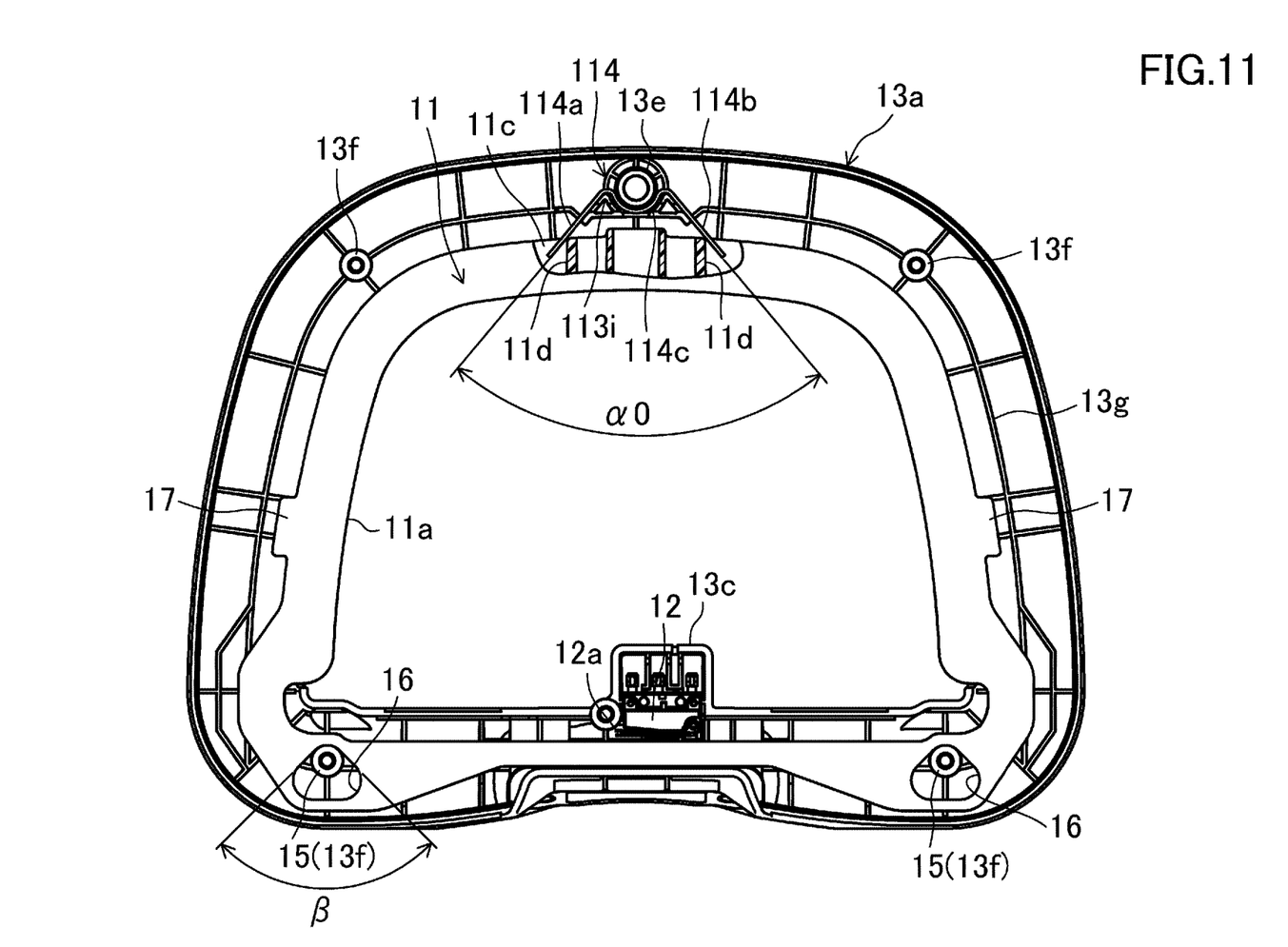
FIG. 11 corresponds to FIG. 1 and illustrates a variation of an embodiment.

FIG. 11 illustrates a variation of the embodiment of the present invention. This variation includes a spring differently structured from that of the embodiment described above. Note that in this variation, components that are the same as those shown in FIGS. 1-10 will be identified by the corresponding reference characters, and detailed description thereof will be omitted herein.

Specifically, the spring of this variation is configured as a leaf spring 114 which does not have the helical portion 14c. The leaf spring 114 has a pair of arms 114a and 114b, and an arch-shaped connection portion 114c connecting the arms 114a and 114b together and functioning as a supported portion. Unlike the spring of the embodiment described above, the connection portion 114c is not helical. The connection portion 114c is sandwiched between an arm catch 113i and a boss 13e for a spring, rather than being fitted on the outer periphery of the boss 13e for a spring.

Also in this variation, when a switch lever 11 is under no gripping pressure, the arm catch 113i pushes the pair of arms 114a and 114b away from each other, thereby ensuring a slight gap between each of the arms 114a and 114b and the switch lever 11.

Other Embodiments

The embodiment of the present invention described above may be modified as follows.

Specifically, in the embodiment described above, the handle for an electric tool is configured as the front handle 10 of the hedge trimmer 1 as an example. However, the handle for an electric tool may be configured as the handle of a brush cutter or a chain saw.

The pair of limiters 15 of the embodiment described above is configured as the coupling bosses 13f provided on the handle body 13. However, the limiters 15 may be configured as other projections provided on the handle body 13, or pins provided on the switch lever 11, for example. In the latter case, triangle recesses corresponding to these pins are provided as guides on the handle body 13, thereby suitably limiting the movement of the switch lever 11.

Although the embodiment described above includes only two sets of the limiters 15 and the guides 16, three or more sets of the limiters 15 and the guides 16 may be provided.

In the embodiment described above, when the switch lever 11 is under no gripping pressure as illustrated in FIGS. 1 and 11, the slight gap c is ensured between each of the pair of arms 14a and 14b and the associated pressed rib 11d of the switch lever 11. However, the pair of arms 14a and 14b may be softly in contact with the associated pressed rib 11d without leaving the gap c.

Note that the embodiment described above is merely a preferred example in nature, and is not intended to limit the scope, application, or uses of the present invention.

INDUSTRIAL APPLICABILITY

As described above, the present invention is useful as a handle for an electric tool such as a hedge trimmer or a brush cutter.

DESCRIPTION OF REFERENCE CHARACTERS

1 Hedge Trimmer (Electric Tool)
2 Casing
3 Blade
4 Rear Handle
5 Battery-Attaching Portion
6 Main Switch
7 Trigger Lever
8 Unlocking Lever
9 Inner Peripheral Slit
10 Front Handle (Handle for Electric Tool)
11 Switch Lever
11a Operational Portion
11b Switch-Pressing Portion
11c Recess
11d Pressed Rib
12 On/Off Switch
12a Lever
13 Handle Body
13a Rear Body
13b Front Body
13c Switch Housing
13d Guard
13e Boss for Spring
13f Coupling Boss
13g Lever-Receiving Rib
13h Bolt Insertion Hole
13i Arm Catch
14 Helical Torsion Spring (Spring)
14a, 14b Pair of Arms
14c Helical Portion (Supported Portion)
15 Limiter
16 Guide
17 Protrusion
50 Bolt
113i Arm Catch
114 Leaf Spring (Spring)
114a, 114b Pair of Arms
114c Connection Portion (Supported Portion)
$\alpha 0$ Arm Angle under No Gripping Pressure
$\alpha$ Arm Angle under Gripping Pressure
$\beta$ Vertex Angle of Guide

The invention claimed is:

1. A handle for an electric tool, the handle mounted to an electric tool, provided with an on/off switch, and comprising:
   a switch lever including an operational portion having an inverted U-shape, and configured to press the on/off switch when the operational portion is gripped and pressed;
   a handle body with the on/off switch mounted thereto, the handle body having an inner peripheral slit, and housing the switch lever such that the operational portion of the switch lever projects from the inner peripheral slit;
   a spring having a supported portion and a pair of arms extending from the supported portion, housed in the handle body, and biasing and pushing the switch lever back to a position under no gripping pressure; and
   a plurality of limiters provided at locations in either the handle body or the switch lever at a distance from the spring, and configured to limit movement of the switch lever when each of the plurality of limiters comes into contact with an inner surface of one of a plurality of guides, wherein
   the handle for the electric tool is configured such that
   when the operational portion is pressed, the spring is pushed to increase an angle between the pair of arms, and the on/off switch is pressed by contact with switch lever and turned on, and
   when the switch lever is released, the spring biases and pushes the switch lever back to the position under no gripping pressure, such that the switch lever is not in contact with the on/off switch, and the on/off switch is turned off,
   the switch lever is in a continuous loop shape, and
   the on/off switch is arranged at a location between the plurality of limiters, opposite to the spring, and within the continuous loop shape of the switch lever.

2. The handle of claim 1, wherein
   the supported portion of the spring is supported on the handle body, and
   when the switch lever is under no gripping pressure, the pair of arms is positioned by being in contact with an arm catch provided to the handle body.

3. The handle of claim 2, wherein
   when the switch lever is gripped and pressed in a left or right direction, one of the pair of arms comes into contact with the arm catch and the other comes into contact with a pressed rib of the switch lever.

4. The handle of claim 1, wherein
   the switch lever or the handle body, which is not provided with the plurality of limiters, has a plurality of guides each receiving an associated one of the limiters and each configured as a triangle opening or recess, and
   the switch lever is housed in the handle body such that movement of the switch lever is limited by allowing each of the plurality of limiters to move within the associated one of the guides.

5. The handle of claim 4, wherein
   each of the guides has a vertex angle equal to or larger than the angle formed between the pair of arms of the spring when the switch lever is under no gripping pressure.

6. The handle of claim 4, wherein
   the plurality of guides are provided at only two locations, and each of the limiters is allowed to move within the associated one of the guides.

7. The handle of claim 1, wherein
   when the switch lever is under no gripping pressure, a gap is ensured between the pair of arms and the switch lever, or the switch lever is in contact with the pair of the arms to an extent that the pair of arms does not bias the switch lever.

8. An electric tool comprising the handle of claim 1.

9. The electric tool of claim 8, wherein
   the electric tool is configured as a hedge trimmer including the handle implemented as a front handle.

* * * * *